(12) United States Patent
Meng et al.

(10) Patent No.: US 11,232,782 B2
(45) Date of Patent: Jan. 25, 2022

(54) SPEAKER ADAPTATION FOR ATTENTION-BASED ENCODER-DECODER

(71) Applicant: Microsoft Technology Licensing, LLC, Redmond, WA (US)

(72) Inventors: Zhong Meng, Seattle, WA (US); Yashesh Gaur, Redmond, WA (US); Jinyu Li, Redmond, WA (US); Yifan Gong, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 266 days.

(21) Appl. No.: 16/675,515

(22) Filed: Nov. 6, 2019

(65) Prior Publication Data

US 2021/0065683 A1 Mar. 4, 2021

Related U.S. Application Data

(60) Provisional application No. 62/893,967, filed on Aug. 30, 2019.

(51) Int. Cl.
*G10L 15/065* (2013.01)
*G10L 15/06* (2013.01)
(Continued)

(52) U.S. Cl.
CPC .......... *G10L 15/065* (2013.01); *G10L 15/063* (2013.01); *G10L 15/22* (2013.01); *G10L 19/00* (2013.01)

(58) Field of Classification Search
CPC ..... G10L 15/065; G10L 15/063; G10L 15/22; G10L 19/00
See application file for complete search history.

(56) References Cited

U.S. PATENT DOCUMENTS 11,093,845 B2\* 8/2021 Zoldi ..................... G06N 5/025
2002/0114378 A1\* 8/2002 Yue ....................... H04B 1/7075
375/136
(Continued)

OTHER PUBLICATIONS

Li, et al., "Speaker Adaptation for End-to-End CTC Models", In repository of arxiv, arXiv:1901.01239, Jan. 4, 2019, 8 Pages.
(Continued)

*Primary Examiner* — Michael Colucci
(74) *Attorney, Agent, or Firm* — Buckley, Maschoff & Talwalkar LLC

(57) ABSTRACT

Embodiments are associated with a speaker-independent attention-based encoder-decoder model to classify output tokens based on input speech frames, the speaker-independent attention-based encoder-decoder model associated with a first output distribution, a speaker-dependent attention-based encoder-decoder model to classify output tokens based on input speech frames, the speaker-dependent attention-based encoder-decoder model associated with a second output distribution, training of the second attention-based encoder-decoder model to classify output tokens based on input speech frames of a target speaker and simultaneously training the speaker-dependent attention-based encoder-decoder model to maintain a similarity between the first output distribution and the second output distribution, and performing automatic speech recognition on speech frames of the target speaker using the trained speaker-dependent attention-based encoder-decoder model.

20 Claims, 13 Drawing Sheets

(51) Int. Cl.
G10L 19/00 (2013.01)
G10L 15/22 (2006.01)

(56) References Cited

U.S. PATENT DOCUMENTS

| | | | | |
|---|---|---|---|---|
| 2006/0053014 | A1* | 3/2006 | Yoshizawa | G10L 15/06 704/256.4 |
| 2016/0360336 | A1* | 12/2016 | Gross | H04M 1/72403 |
| 2019/0180732 | A1* | 6/2019 | Ping | G06F 9/30003 |
| 2020/0074292 | A1* | 3/2020 | Kurata | G06N 3/08 |
| 2020/0178825 | A1* | 6/2020 | Lu | A61B 5/363 |
| 2021/0264285 | A1* | 8/2021 | Takahashi | G06N 3/088 |

OTHER PUBLICATIONS

"International Search Report and the Written Opinion Issued in PCT Application No. PCT/US2020/037376", dated Sep. 23, 2020, 26 Pages.
Ba, Jimmy Lei et al., "Layer Normalization", In repository of arXiv, arXiv:1607.06450, Jul. 21, 2016, (pp. 1-14, 14 total pages).
Bahdanau, Dzmitry et al., "End-to-End Attention-based Large Vocabulary Speech Recognition", In Proceedings of IEEE International Conference on Acoustics, Speech and Signal Processing, Mar. 20, 2016, (pp. 4945-4949, 5 total pages).
Bahdanau, Dzmitry et al., "Neural Machine Translation by Jointly Learning to Align and Translate", In repository of arXiv, arXiv:1409.0473, Sep. 1, 2014, (pp. 1-15, 15 total pages).
Chan, William et al., "Listen, Attend and Spell: A Neural Network for Large Vocabulary Conversational Speech Recognition", In Proceedings of IEEE International Conference on Acoustics, Speech and Signal Processing, Mar. 20, 2016, (pp. 4960-4964, 5 total pages).
Chiu, Chung-Cheng et al., "State-of-the-Art Speech Recognition with Sequence-to-Sequence Models", In Proceedings of IEEE International Conference on Acoustics, Speech and Signal Processing, Apr. 15, 2018, (pp. 4774-4778, 5 total pages).
Cho, Kyunghyun et al., "On the Properties of Neural Machine Translation: Encoder-Decoder Approaches", In repository of arXiv, arXiv:1409.1259, Sep. 3, 2014, 9 Pages.
Chorowski, Jan et al., "Attention-Based Models for Speech Recognition", In Proceedings of Advances in Neural Information Processing Systems, vol. 28, Dec. 7, 2015, 9 Pages.
Chung, Junyoung et al., "Empirical Evaluation of Gated Recurrent Neural Networks on Sequence Modeling", In repository of arXiv, arXiv:1412.3555, Dec. 11, 2014, (pp. 1-9, 9 total pages).
Erdogan, Hakan et al., "Multi-Channel Speech Recognition: LSTMs All the Way Through", In Proceedings of 4th CHiME Speech Separation and Recognition Challenge and Workshop, Sep. 13, 2016, 4 Pages.
Ganin, Yaroslav et al., "Unsupervised Domain Adaptation by Backpropagation", In Proceedings of the 32nd International Conference on Machine Learning, vol. 37, Jul. 6, 2015, 10 Pages.
Gaur, Yashesh et al., "Acoustic-to-Phrase Models for Speech Recognition", In Proceedings of 20th Annual Conference of the International Speech Communication Association, Sep. 15, 2019, (pp. 2240-2244, 5 total pages).
Goodfellow, Ian J. et al., "Generative Adversarial Nets", In Proceedings of Advances in Neural Information Processing Systems, Dec. 8, 2014, (pp. 1-9, 9 total pages).
Graves, Alex et al., "Connectionist Temporal Classification: Labelling Unsegmented Sequence Data with Recurrent Neural Networks", In Proceedings of the 23rd International Conference on Machine Learning, Jun. 25, 2006, (pp. 369-376, 8 total pages).
Graves, Alex, "Sequence Transduction with Recurrent Neural Networks", In repository of arXiv, arXiv:1211.3711, Nov. 14, 2012, 9 Pages.
Graves, Alex et al., "Towards End-to-End Speech Recognition with Recurrent Neural Networks", In Proceedings of the 31st International Conference on Machine Learning, Jan. 27, 2014, 9 Pages.

Huang, Zhen et al., "Maximum a Posteriori Adaptation of Network Parameters in Deep Models", In Proceedings of the 16th Annual Conference of the International Speech Communication Association, Sep. 6, 2015, (pp. 1076-1080, 5 total pages).
Huang, Zhen et al., "Rapid Adaptation for Deep Neural Networks Through Multi-Task Learning", In Proceedings of 16th Annual Conference of the International Speech Communication Association, Sep. 6, 2015, (pp. 3625-3629, 5 total pages).
Kullback, S. et al., "On Information and Sufficiency", In Journal of The Annals of Mathematical Statistics, vol. 22, Issue 1, Mar. 1951, (pp. 79-86, 8 total pages).
Li, Jinyu et al., "Advancing Acoustic-to-Word CTC Model", In Proceedings of IEEE International Conference on Acoustics, Speech and Signal Processing, Apr. 15, 2018, (pp. 5794-5798, 5 total pages).
Li, Jinyu et al., "Developing Far-Field Speaker System Via Teacher-Student Learning", In Proceedings of IEEE International Conference on Acoustics, Speech and Signal Processing, Apr. 15, 2018, (pp. 5699-5703, 5 total pages).
Liao, Hank, "Speaker Adaptation of Context Dependent Deep Neural Networks", In Proceedings of IEEE International Conference on Acoustics, Speech and Signal Processing, May 26, 2013, (pp. 7947-7951, 5 total pages).
Meng, Zhong et al., "Adversarial Feature-Mapping for Speech Enhancement", In Proceedings of 19th Annual Conference of the International Speech Communication Association, Sep. 2, 2018, 5 Pages.
Meng, Zhong et al., "Adversarial Speaker Adaptation", In Proceedings of IEEE International Conference on Acoustics, Speech and Signal Processing, May 12, 2019, (pp. 5721-5725, 5 total pages).
Meng, Zhong et al., "Adversarial Speaker Verification", In Proceedings of IEEE International Conference on Acoustics, Speech and Signal Processing, May 12, 2019, (pp. 6216-6220, 5 total pages).
Meng, Zhong et al., "Adversarial Teacher-Student Learning for Unsupervised Domain Adaptation", In Proceedings of IEEE International Conference on Acoustics, Speech and Signal Processing, Apr. 15, 2018, (pp. 5949-5953, 5 total pages).
Meng, Zhong et al., "Attentive Adversarial Learning for Domain-invariant Training", In Proceedings of IEEE International Conference on Acoustics, Speech and Signal Processing, May 12, 2019, (pp. 6740-6744, 5 total pages).
Meng, Zhong et al., "Conditional Teacher-Student Learning", In Proceedings of IEEE International Conference on Acoustics, Speech and Signal Processing, May 12, 2019, (pp. 6445-6449, 5 total pages).
Meng, Zhong et al., "Cycle-Consistent Speech Enhancement", In Proceedings of 19th Annual Conference of the International Speech Communication Association, Sep. 2, 2018, 5 Pages.
Meng, Zhong et al., "Deep Long Short-term Memory Adaptive Beamforming Networks for Multichannel Robust Speech Recognition", In Proceedings of IEEE International Conference on Acoustics, Speech and Signal Processing, Mar. 5, 2017, (pp. 271-275, 5 total pages).
Meng, Zhong, "Discriminative and Adaptive Training for Robust Speech Recognition and Understanding", A Dissertation presented to The Academic Faculty in Partial Fulfillment of the Requirements for the Degree Doctor of Philosophy in the School of Electrical and Computer Engineering, Georgia Institute of Technology, Aug. 2018, 144 Pages.
Meng, Zhong et al., "Speaker-Invariant Training Via Adversarial Learning", In Proceedings of IEEE International Conference on Acoustics, Speech and Signal Processing, Apr. 15, 2018, (pp. 5969-5973, 5 total pages).
Meng, Zhong et al., "Unsupervised Adaptation with Domain Separation Networks for Robust Speech Recognition", In Proceedings of IEEE Automatic Speech Recognition and Understanding Workshop, Dec. 16, 2017, (pp. 214-221, 8 total pages).
Ochiai, Tsubasa et al., "Speaker Adaptation for Multichannel End-to-End Speech Recognition", In Proceedings of IEEE International Conference on Acoustics, Speech and Signal Processing, Apr. 15, 2018, (pp. 6707-6711, 5 total pages).
Pascual, Santiago et al., "SEGAN: Speech Enhancement Generative Adversarial Network", In Proceedings of the 18th Annual Confer-

(56) References Cited

OTHER PUBLICATIONS ence of the International Speech Communication Association, Aug. 20, 2017, (pp. 3642-3646, 5 total pages).

Paszke, Adam et al., "Automatic Differentiation in PyTorch", In Proceedings of Thirty-first Conference on Neural Information Processing Systems, Dec. 4, 2017, 4 Pages.

Samarakoon, Lahiru et al., "Factorized Hidden Layer Adaptation for Deep Neural Network Based Acoustic Modeling", In Journal of IEEE/ACM Transactions on Audio, Speech, and Language Processing, vol. 24, Issue 12, Dec. 2016, DOI: 10.1109/TASLP.2016.2601146, (pp. 2241-2250, 10 total pages).

Seide, Frank et al., "Feature Engineering in Context-Dependent Deep Neural Networks for Conversational Speech Transcription", In Proceedings of IEEE Workshop on Automatic Speech Recognition & Understanding, Dec. 11, 2011, (pp. 24-29, 6 total pages).

Serdyuk, Dmitriy et al., "Invariant Representations for Noisy Speech Recognition", In Proceedings of Thirtieth Conference on Neural Information Processing Systems, Dec. 5, 2016, 5 Pages.

Shinohara, Yusuke, "Adversarial Multi-task Learning of Deep Neural Networks for Robust Speech Recognition", In Proceedings of 17th Annual Conference of the International Speech Communication Association, Sep. 8, 2016, (pp. 2369-2372, 4 total pages).

Sun, Sining et al., "An Unsupervised Deep Domain Adaptation Approach for Robust Speech Recognition", In Journal of Neurocomputing, vol. 257, Sep. 27, 2017, (pp. 79-87, 9 total pages).

Swietojanski, Pawel et al., "Learning Hidden Unit Contributions for Unsupervised Acoustic Model Adaptation", In Journal of IEEE/ACM Transactions on Audio, Speech, and Language Processing, vol. 24, Issue 8, Aug. 2016, DOI: 10.1109/TASLP.2016.2560534, (pp. 1450-1463, 14 total pages).

Toth, Laszlo et al., "Adaptation of DNN Acoustic Models Using KL-divergence Regularization and Multi-task Training", In Proceedings of International Conference on Speech and Computer, Aug. 23, 2016, DOI: 10.1007/987-3-319-43958-7_12, (pp. 108-115, 8 total pages).

Xue, Shaofei et al., "Fast Adaptation of Deep Neural Network Based on Discriminant Codes for Speech Recognition", In Journal of IEEE/ACM Transactions on Audio, Speech, and Language Processing, vol. 22, Issue 12, Dec. 2014, DOI: 10.1109/TASLP.2014.2346313, (pp. 1713-1725, 13 total pages).

Xue, Jain et al., "Restructuring of Deep Neural Network Acoustic Models with Singular Value Decomposition", In Proceedings of 14th Annual Conference of the International Speech Communication Association, Aug. 25, 2013, (pp. 2365-2369, 5 total pages).

Yu, Dong et al., "KL-Divergence Regularized Deep Neural Network Adaptation for Improved Large Vocabulary Speech Recognition", In Proceedings of IEEE International Conference on Acoustics, Speech and Signal Processing, May 26, 2013, (pp. 7893-7897, 5 total pages).

Zhao, Yong et al., "Low-Rank Plus Diagonal Adaptation for Deep Neural Networks", In Proceedings of IEEE International Conference on Acoustics, Speech and Signal Processing, Mar. 20, 2016, (pp. 5005-5009, 5 total pages).

\* cited by examiner

SPEAKER ADAPTATION FOR ATTENTION-BASED ENCODER-DECODER

CROSS-REFERENCE TO RELATED APPLICATIONS

The present application claims the benefit of U.S. Provisional Patent Application No. 62/893,967, filed Aug. 30, 2019, the entire contents of which are incorporated herein by reference for all purposes.

BACKGROUND

Neural network-based models are commonly used to perform automatic speech recognition (ASR). In some examples, a deep neural network (DNN)-based acoustic model is trained to extract senone-discriminative features from input speech frames and to classify senones based on the extracted features. In other examples, an end-to-end (E2E) ASR system directly maps a sequence of input speech frames to a sequence of corresponding output labels (i.e., a transcription) by incorporating the acoustic model, pronunciation model and language model of a traditional ASR system into a single DNN.

A speaker-independent (SI) E2E ASR system trained using the speech frames of many different speakers may generally perform well with respect to the speech of most speakers. The accuracy of a SI E2E ASR system degrades when used to recognize the speech of an unseen speaker. Accordingly, model adaptation attempts to adapt a SI E2E ASR system into a speaker-dependent (SD) E2E ASR system associated with a given target speaker and that achieves improved accuracy when applied to speech frames of the given target speaker, regardless of whether or not the target speaker was represented in the original training data. However, due to the limited amount of available adaptation data (i.e., speech frames of the target speaker), re-training an SI E2E ASR system based on the adaptation data may simply cause the resulting adapted E2E ASR system to be overfitted to the adaptation data.

An attention-based encoder-decoder (AED) model is a type of E2E ASR system. An AED model directly maps a sequence of speech frames to an output sequence of tokens via an encoder, a decoder and an attention network. The output tokens can be phonemes, characters, word/subword units, etc.

Current techniques for speaker adaptation of an AED model have been limited to constrained retraining of a partial set of model parameters. Systems are desired for efficiently adapting an AED model to achieve improved accuracy with respect to speech frames of a target speaker based on limited adaptation data.

DETAILED DESCRIPTION

The following description is provided to enable any person in the art to make and use the described embodiments. Various modifications, however, will remain readily apparent to those of ordinary skill in the art.

Some embodiments provide regularization-based speaker adaptation for AED-based E2E ASR. Such regularization-based speaker adaptation may address adaptation data sparsity more efficiently than other adaptation techniques. The output units of the adapted AED model are tokens which may comprise WSUs, phonemes, characters, or other entities.

Some embodiments employ a Kullback-Leibler divergence (KLD) regularization in which the KLD between output distributions of the adapted and original speaker-independent AED models is minimized while optimizing an adaptation criterion (e.g., minimized token loss via the adaptation data). Other embodiments employ adversarial speaker adaptation in which an auxiliary discriminator network is jointly trained with the adapted AED model to maintain similarity between deep-feature distributions of the adapted and original speaker-independent AED models. The latter embodiments may offset deficiencies of KLD as an asymmetric measure of distribution similarity.

Embodiments may alternatively implement multi-task learning for speaker adaptation of an AED model. For example, an encoder of a speaker-independent AED model is trained to simultaneously perform (in conjunction with a fixed decoder and attention network of a speaker-independent AED model) a primary task of predicting a large number of WSU units and (in conjunction with a fixed character decoder and character-based attention network of a speaker-independent AED model) an auxiliary task of predicting a small number of character units. Such embodiments may address the sparsity of WSU targets in the adaptation data.

Figure 1:
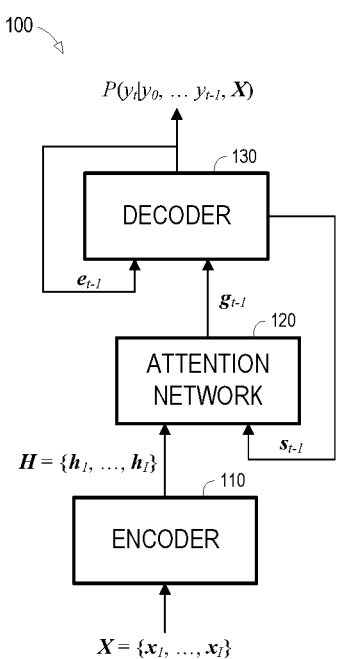
FIG. 1 is a block diagram of an attention-based encoder-decoder (AED) for automatic speech recognition.

FIG. 1 illustrates AED 100 to inform the following descriptions of adaptation of an E2E AED model according to some embodiments. Embodiments are not limited to adaptation of AED model 100. As described above, an AED model is not limited to classification of WSUs.

According to the present example, AED 100 models the conditional probability distribution P(Y|X) over sequences of output token labels Y={$y_1, \ldots, y_T$} given a sequence of input speech frames X={$x_1 \ldots, x_J$}. Encoder 110 may comprise a recurrent neural network (RNN) which encodes the sequence of input speech frames X into a sequence of features H={$h_1, \ldots, h_T$}. Accordingly:

$$P(Y \mid X) = P(Y \mid H) = \prod_{t=1}^{T} P(y_t \mid Y_{0:t-1}, H)$$

Decoder 130 may comprise an RNN to model P(Y|H). To capture the conditional dependence on H, attention network 120 determines relative weights with which the encoded features of H should be considered in the prediction of output label $y_t$ and to generate a corresponding context vector $g_t$ as a linear combination of H.

At each time step t, decoder 130 takes the sum of the previous token embedding $e_{t-1}$ and the context vector $g_{t-1}$ as the input to predict a conditional probability of each possible token, i.e., P(u|$Y_{0:t-1}$, H), u∈$\mathbb{U}$, at time t, where $\mathbb{U}$ is the set of all possible (e.g., 33K in the case of WSUs) tokens:

$s_t = \text{RNN}^{dec}(s_{t-1}, e_{t-1} + g_{t-1})$ $[P(u|Y_{0:t-1}, H)]_{u \in \mathbb{U}} = \text{Softmax}[W_y(s_t + g_t) + b_y]$, where $s_t$ is the hidden state of decoder 130, and bias $b_y$ and matrix $W_y$ are learnable parameters.

During training, model 100 is trained to minimize loss $\mathcal{L}_{AED}$ on training corpus $\mathbb{T}$ as follows:

$\mathcal{L}_{AED}(\theta^{SI}, \mathbb{T}_r) = -\Sigma_{(X,Y) \in \mathbb{T}_r} \Sigma_{t=1}^{|Y|} \log P(y_t|Y_{0:t-1}, H, \theta^{SI})$, where $\theta^{SI}$ denotes all the model parameters in the AED model 100 and |Y| represents the number of elements in the label sequence Y.

Figure 2:
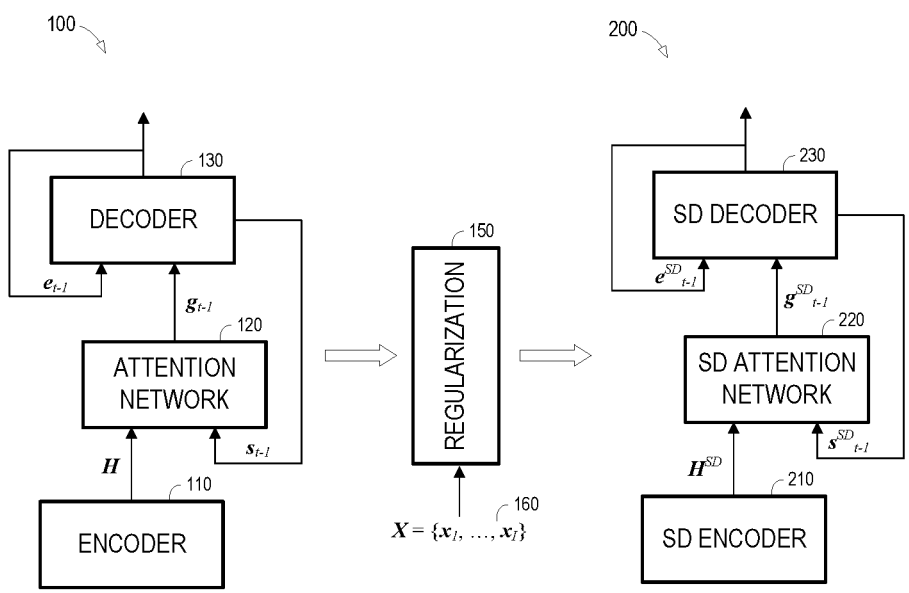
FIG. 2 is a block diagram illustrating regularization-based speaker adaptation of an AED according to some embodiments.

FIG. 2 illustrates regularization-based speaker adaptation of an AED model according to some embodiments. As shown, AED model 100 is subjected to regularization by component 150 based on adaptation frames 160. Adaptation frames 160 may comprise speech frames of a target speaker. Regularization component 150 operates to generate speaker-dependent AED model 200 for performing ASR on speech of the target speaker. According to some embodiments, speaker-dependent AED model 200 provides improved accuracy over AED model 100 with respect to input speech of the target speaker, while an exhibiting an output distribution similar to AED model 100. AED model 100 and AED model 200 generate sequences of the same type of tokens, such as WSUs, phonemes, and characters.

Figure 3:
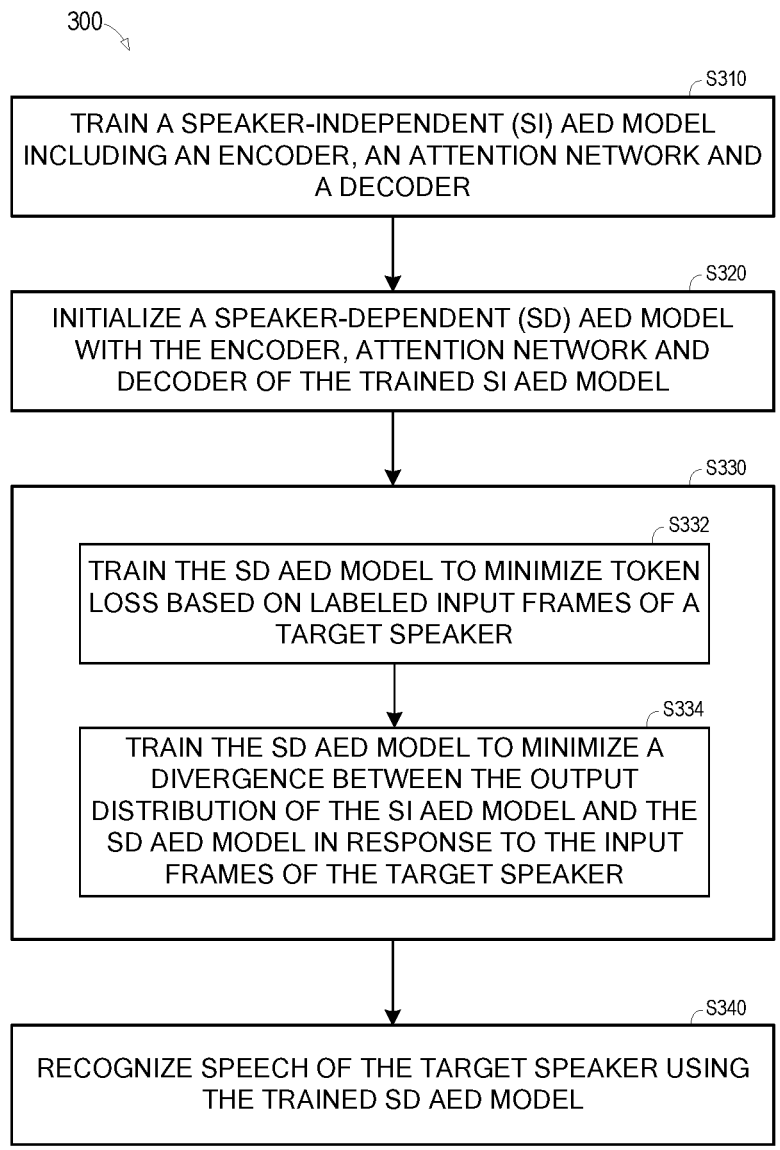
FIG. 3 is a flow diagram of a process to adapt a speaker-independent AED model to a target speaker based on divergence regularization according to some embodiments.

FIG. 3 is a flow diagram of process 300 to adapt a speaker-independent AED model to a target speaker by minimizing the KLD between output distributions of the adapted and original AED models while simultaneously training the adapted AED model based on the adaptation data. Such minimization may reduce overfitting of the adapted AED model to the limited set of target speaker speech typically used for adaptation.

Process 300 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, a speaker-independent AED model is trained at S310 as is known in the art. As described with respect to FIG. 1, the speaker-independent AED model includes an encoder, an attention network and a decoder. The speaker-independent AED model is trained at S310 based on a large training set of labeled utterances of a large number of speakers. In the present example, the labels comprise tokens, but embodiments are not limited thereto. According to the example, the speaker-independent AED model is trained to minimize a token loss with respect to the training set as is known in the art.

According to some embodiments, the encoder is a bi-directional gated recurrent units (GRU)-RNN with 6 hidden layers, each of which includes 512 hidden units. Layer normalization is applied for each hidden layer. The decoder is a uni-directional GRU-RNN with 2 hidden layers, each of which 512 hidden units, and an output layer to predict posteriors of the 33 k WSUs. Each WSU label is represented by a 512-dimensional embedding vector. GRU may be used instead of long short-term memory for the RNN due to the reduced number of parameters and faster training.

According to one example, the training set consists of 3400 hours training data from seven speakers, and 20,203 total words. The input speech frames are 80-dimensional log Mel filter bank (LFB) features extracted from the speech signals every 10 ms over a 25 ms window. Three consecutive frames are stacked and the stacked frame is strided by 30 ms to form 240-dimensional input speech frames. 33755 mixed units are generated as the set of WSUs based on the training transcription and mixed-unit label sequences are produced as training targets.

Figure 4:
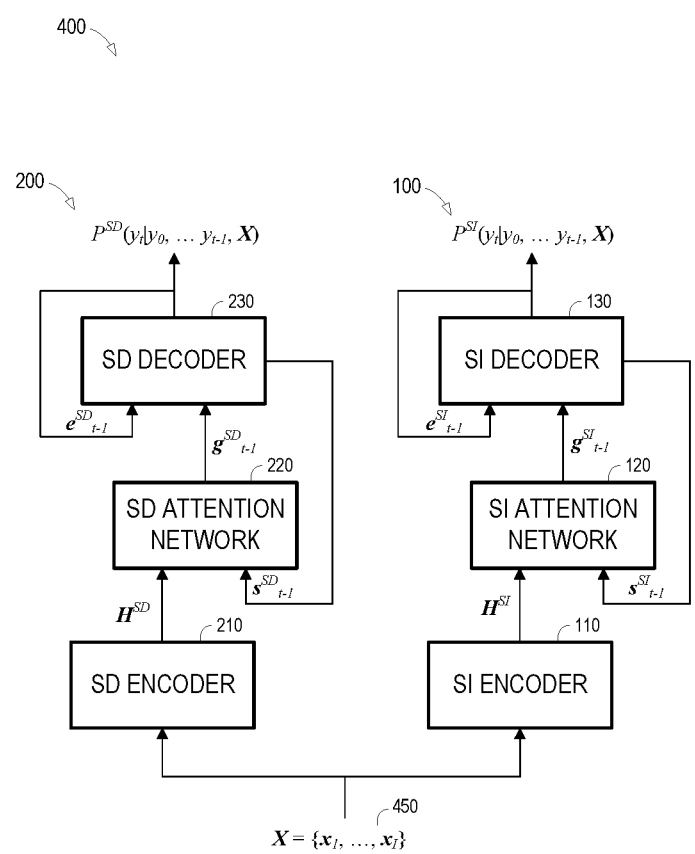
FIG. 4 is a block diagram illustrating a training architecture for speaker adaptation of an AED model based on divergence regularization according to some embodiments.

Next, at S320, a speaker-dependent AED model is initialized using the encoder, an attention network and a decoder of the speaker-independent AED model trained at S310. FIG. 4 illustrates a training architecture according to process 300. Architecture 400 may provide speaker adaptation of an speaker-independent AED model by minimizing the KLD between output distributions of the adapted and original AED models while simultaneously training the adapted AED model based on the adaptation data. Such minimization may address overfitting of the adapted AED model to the limited set target speaker speech typically used for adaptation.

As shown, architecture 400 includes speaker-independent AED model 100 which may be implemented and trained as described above. Per S320, speaker-dependent AED model 200 initially represents a cloned version of AED model 100 according to some embodiments. For example, each trained component 110, 120 and 130 is duplicated to form corresponding components 210, 220 and 230 of AED model 200.

Training of speaker-dependent AED model 200 proceeds at S330, which consists of S332 and S334. In particular, the parameters of components 210, 220 and 230 are trained at S332 to minimize the token loss of AED model 200 with respect to adaptation speech frames 350 of the target speaker. Simultaneously at S334, and while keeping the parameters of each trained component 110, 120 and 130 of AED model 100 fixed, the token-level KLD between the output distributions of AED model 100 and AED model 100 are computed and the parameters of components 210, 220 and 230 are trained to minimize and the KLD. According to some embodiments, the token-level KLD is computed as:

$$\sum_{t=1}^{T} \sum_{u \in U} P(u \mid Y_{0:t-1}, X, \theta^{SI}) \log \frac{P(u \mid Y_{0:t-1}, X, \theta^{SI})}{P(u \mid Y_{0:t-1}, X, \theta^{SD})},$$

where $\theta^{SI}$ denotes all the parameters of each component of AED model 100. Only the $\theta^{SD}$-related terms are added to the AED loss within the KLD regularization since $\theta^{SI}$ are not updated during training as described above.

Therefore, the regularized loss function for KLD adaptation of AED 100 may be computed as shown below, where $\mathbb{A}$ is adaptation set of speech frames 350.

$$\mathcal{L}_{KLD}(\theta^{SI}, \theta^{SD}, \mathbb{A}) =$$
$$-(1-\rho)\mathcal{L}_{AED}(\theta^{SD}, \mathbb{A}) - \rho \sum_{(X,Y) \in \mathbb{A}} \sum_{t=1}^{|Y|} \sum_{u \in U} P(u \mid Y_{0:t-1}, X, \theta^{SI})$$
$$\log P(u \mid Y_{0:t-1}, H, \theta^{SD}) =$$
$$- \sum_{(X,Y) \in \mathbb{A}} \sum_{t=1}^{|Y|} \sum_{u \in U} \{(1-\rho)\mathbb{1}[u=y_t] + \rho P(u \mid Y_{0:t-1}, X, \theta^{SI})\}$$
$$P(u \mid Y_{0:t-1}, H, \theta^{SD}), \hat{\theta}^{SD} = \arg_{\theta^{SD}} \min \mathcal{L}_{KLD}(\theta^{SI}, \theta^{SD}, \mathbb{A}),$$

where $\rho \in [0,1]$ is the regularization weight, $\mathbb{1}$ is the indicator function and $\hat{\theta}^{SD}$ denotes the optimized parameters of AED model 200.

In KLD regularization of a pre-trained speaker-independent AED model according to some embodiments, $\mathbb{1}[u=y_t]$ represents a one-hot hard label and $P(u \mid Y_{0:t-1}, X, \theta^{SI})$ represents the soft posteriors. The target of the cross-entropy loss $\mathcal{L}_{KLD}(\theta^{SI}, \theta^{SD}, \mathbb{A})$ is a linear combination of these two, i.e., $(1-\rho)\mathbb{1}[u=y_t] + \rho P(u \mid Y_{0:t-1}, X, \theta^{SI})$.

After completion of the training at S330, flow proceeds to S340 to recognize speech of the target speaker using the trained SD AED model. With reference to FIG. 4, the trained SD AED model includes SD encoder 210, SD attention network 220 and SD decoder 230, each of which implements corresponding ones of optimized parameters $\hat{\theta}^{SD}$. S340 consists of inputting speech frames of the target speaker to trained SD encoder 210 and outputting corresponding token posteriors from SD decoder 230.

KLD is an asymmetric metric since the minimization of $\mathcal{KL}(P_{SI} \| P_{SD})$ does not guarantee the minimization of $\mathcal{KL}(P_{SD} \| P_{SI})$. In contrast, adversarial learning achieves a global optimum if and only if the SD and SI AEDs share exactly the same hidden-unit distribution at a given layer.

Figure 5:
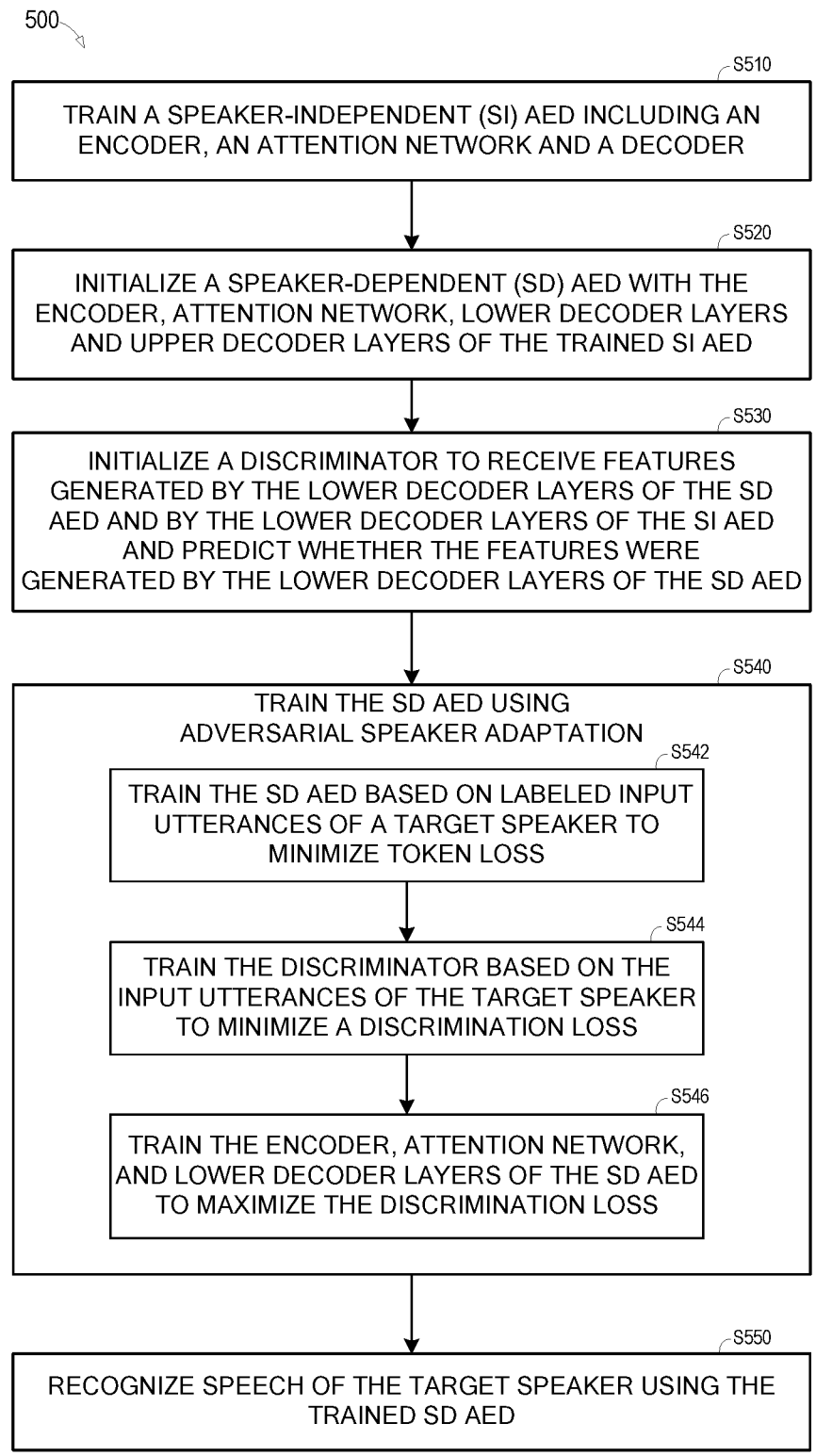
FIG. 5 is a flow diagram of a process to adapt a speaker-independent AED model to a target speaker based on adversarial speaker adaptation according to some embodiments.

FIG. 5 is a flow diagram of process 500 to jointly train the adapted AED model and an auxiliary discriminator network to maintain similarity between deep-feature distributions of the adapted and original speaker-independent AED models. Embodiments of process 500 may address deficiencies of KLD as an asymmetric measure of distribution similarity.

Figure 6:
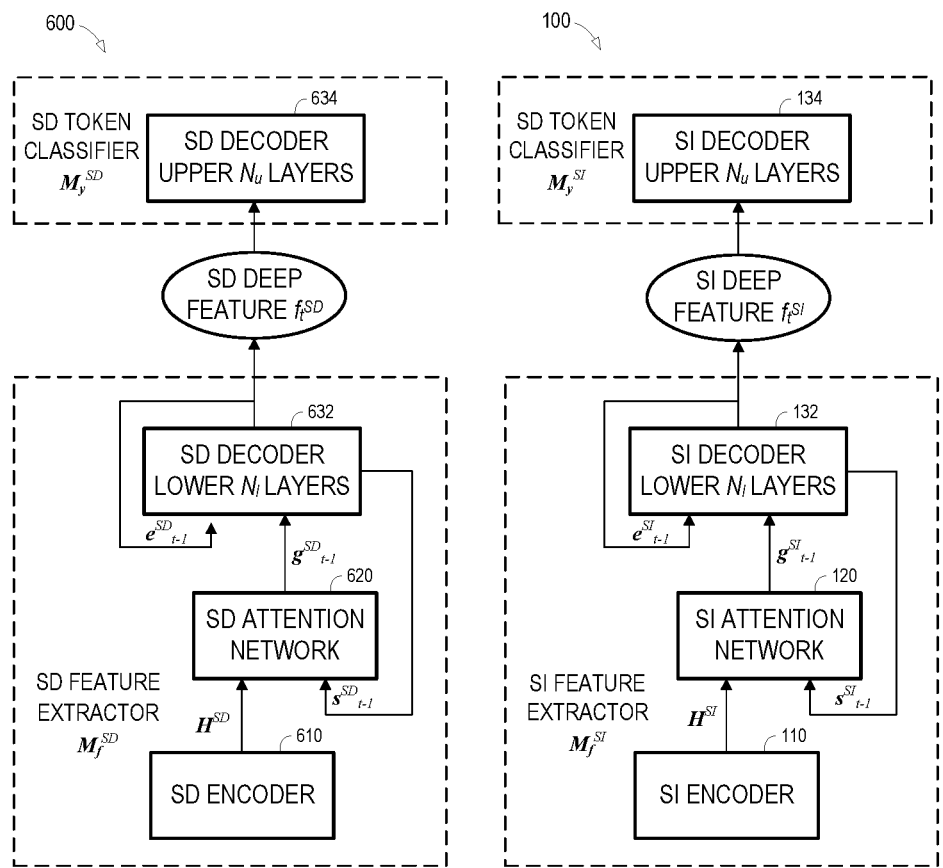
FIG. 6 is a block diagram illustrating cloned portions of a speaker-independent AED model prior to adversarial speaker adaptation according to some embodiments.

A speaker-independent AED model is trained at S510. Training of the speaker-independent AED model at S510 may proceed as described above or as is otherwise known in the art. Next, at S520, a speaker-dependent AED model is initialized using the encoder, an attention network and decoder of the trained speaker-independent AED model. FIG. 6 illustrates initialization at S520 according to some embodiments. Illustrated models 100 and 600 may generate any type of AED model tokens known in the art, including but not limited to WSUs, phonemes and characters.

As shown, encoder 110, attention network 120, and lower decoder layers 132 of the previously-trained SI AED model 100 are viewed as a SI feature extractor $M_f^{SI}$ with parameters $\theta_f^{SI}$ and the upper decoder layers 134 of the previously-trained SI AED model are viewed as SI classifier $M_y^{SI}$ with parameters $\theta_y^{SI}$. $M_f^{SI}$ maps input speech frames X to a sequence of SI deep features $F^{SI} = \{f_1^{SI}, \ldots, f_T^{SI}\}$.

According to some embodiments, $M_f^{SI}$ is used to initialize SD feature extractor $M_f^{SD}$ such that parameters $\theta_f^{SD} = \theta_f^{SI}$ and $M_y^{SI}$ are used to initialize SD classifier $M_y^{SD}$ such that parameters $\theta_y^{SD} = \theta_y^{SI}$. Accordingly, in SD AED model 600, $M_f^{SD}$ extracts SD deep features $F^{SD} = \{f_1^{SD}, \ldots, f_T^{SD}\}$ from X.

Figure 7:
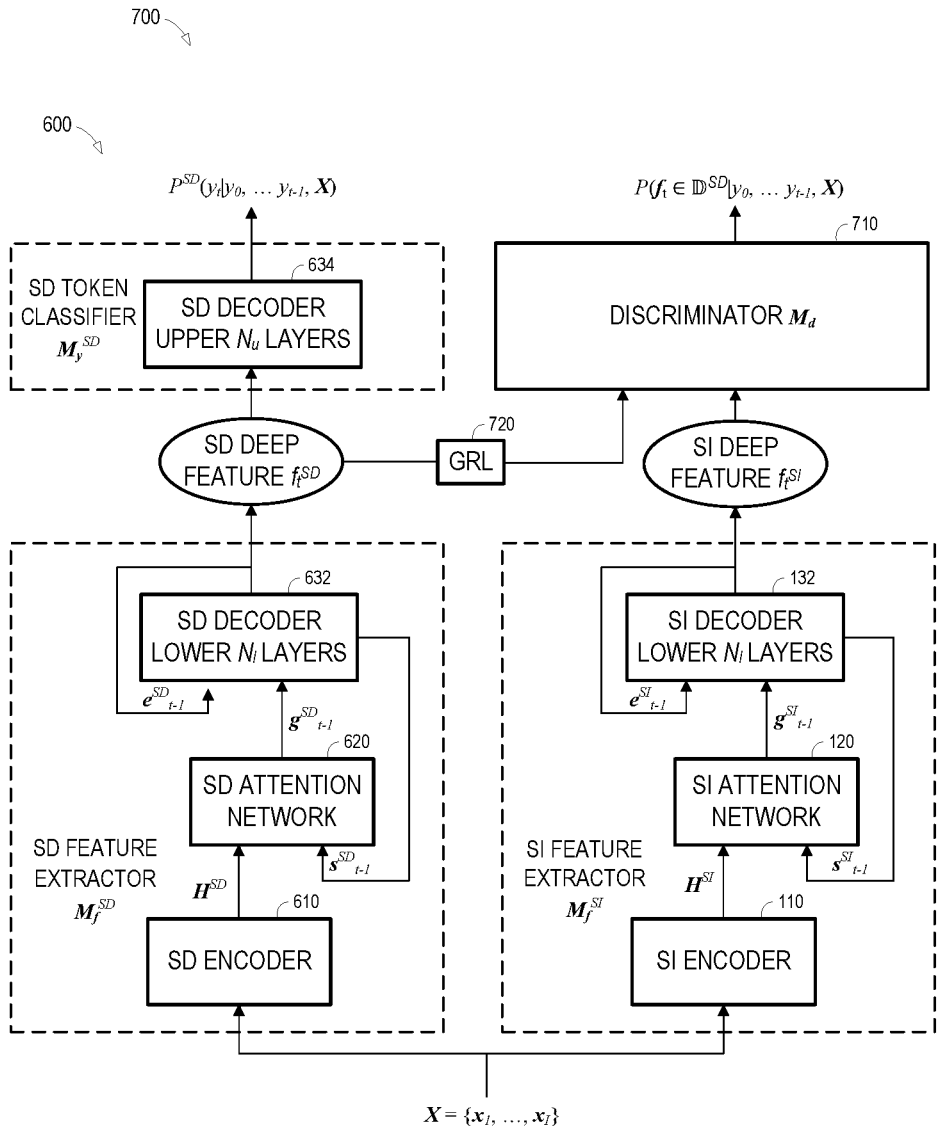
FIG. 7 is a block diagram illustrating a training architecture for adversarial speaker adaptation of a speaker-independent AED model according to some embodiments.

A discriminator is initialized at S530. With reference to FIG. 7, discriminator 710 is intended to receive features generated by lower decoder layers 132 of SI AED model 100 and features generated by lower decoder layers 632 of SD AED model 600, and to predict whether or not the features were generated by generated by lower decoder layers 632. According to some embodiments, discriminator 710 includes parameters $\theta_d$ and takes $F^{SI}$ and $F^{SD}$ as input to predict the posterior $P(f_t \in \mathbb{D}^{SD} \mid Y_{0:t-1}, X)$ that the input deep feature $f_t$ is generated by SD AED 600 with the following discrimination loss:

$$\mathcal{L}_{DISC}(\theta_f^{SD}, \theta_f^{SI}, \theta_d, \mathbb{A}) =$$
$$- \sum_{(X,Y) \in \mathbb{A}} \sum_{t=1}^{|Y|} \log P(f_t^{SD} \in \mathbb{D}^{SD} \mid Y_{0:t-1}, X, \theta_f^{SD}, \theta_d) +$$
$$\log P(f_t^{SI} \in \mathbb{D}^{SI} \mid Y_{0:t-1}, X, \theta_f^{SI}, \theta_d)$$

where $\mathbb{D}^{SD}$ and $\mathbb{D}^{SI}$ are the sets of SD and SI deep features, respectively.

In some embodiments, discriminator $M_d$ 710 is a feed-forward DNN including a 512-dimensional input layer, 2 hidden layers and 512 hidden units for each layer. The output layer of $M_d$ 710 may include 1 unit predicting the posteriors of $f_t \in \mathbb{D}^{SD}$.

The initialized speaker-dependent AED model is trained at S540, which consists of S542, S544 and S546, based on adaptation speech frames of a target speaker. The parameters of components 610, 620, 632 and 634 are trained at S542 to minimize the token loss of AED model 600 so as to make $F^{SD}$ token-discriminative. Simultaneously, the parameters of discriminator 710 are trained at S544 to minimize discrimination loss, and the parameters of SD feature extractor $M_f^{SD}$ are trained at S546 to maximize the discrimination loss. In other words, a discrimination loss $\mathcal{L}_{disc}$ is minimized with respect to $\theta_d$ and maximized with respect to $\theta_f^{SD}$. This minimax competition will converge to the point where $M_f^{SD}$ generates extremely confusing $F^{SD}$ that discriminator 710 is unable to distinguish whether they are generated by $M_f^{SD}$ or $M_f^{SI}$.

The optimization of S544 and S546 is based on an understanding that the ability of discriminator 170 to accurately discriminate between features generated by SD feature extractor $M_f^{SD}$ and SI feature extractor $M_f^{SI}$ is inversely related to the similarity of the distributions of the intermediate deep features generated by each extractor. After training at S540, SD AED model 600 is regularized such that its distribution is substantially similar to SI AED model 100.

S540 may be formulated as below according to some embodiments:

$$(\hat{\theta}_f^{SD}, \hat{\theta}_y^{SD}) = \arg\min_{\theta_f^{SD}, \theta_y^{SD}} \left[ \mathcal{L}_{AED}(\theta_f^{SD}, \theta_y^{SD}, \mathbb{A}) - \lambda \mathcal{L}_{disc}(\theta_f^{SD}, \theta_f^{SI}, \hat{\theta}_d, \mathbb{A}) \right]$$

$$(\hat{\theta}_d) = \arg\min_{\theta_d} \mathcal{L}_{disc}(\hat{\theta}_f^{SD}, \theta_f^{SI}, \theta_d, \mathbb{A})$$

where $\lambda$ controls the trade-off between $\mathcal{L}_{AED}$ and $\mathcal{L}_{disc}$, and $\hat{\theta}_f^{SD}$, $\hat{\theta}_y^{SD}$ and $\hat{\theta}_d$ are the trained network parameters. The pre-trained SI AED model only serves as a reference during training and its parameters $\theta_f^{SI}$, $\theta_y^{SI}$ are fixed throughout training.

$\theta_f^{SD}$, $\theta_y^{SD}$ and $\hat{\theta}_d$ may be updated during training via back propagation with stochastic gradient descent as follows:

$$\theta_f^{SD} \leftarrow \theta_f^{SD} - \mu \left[ \frac{\partial \mathcal{L}_{AED}}{\partial \theta_f^{SD}} - \lambda \frac{\partial \mathcal{L}_{disc}}{\partial \theta_f^{SD}} \right]$$

$$\theta_d \leftarrow \theta_d - \mu \frac{\partial \mathcal{L}_{disc}}{\partial \theta_d}$$

$$\theta_y^{SD} \leftarrow \theta_y^{SD} - \mu \frac{\partial \mathcal{L}_{AED}}{\partial \theta_y^{SD}}$$

where $\mu$ is the learning rate. The negative coefficient $-\lambda$ induces a reversed gradient that maximizes $\mathcal{L}_{disc}(\theta_f^{SD}, \theta_d)$ to result in speaker-invariant deep features. Gradient reversal layer 280 may provide an identity transform in the forward propagation and multiply the gradient by $-\lambda$ during the backward propagation.

Flow proceeds from S540 to S550 to recognize speech of the target speaker using the SD AED model trained at S540. With reference to FIG. 7, the trained SD AED model consists of SD feature extractor $M_f^{SD}$ implementing trained parameters $\hat{\theta}_f^{SD}$ and SD token classifier $M_y^{SD}$ implementing trained parameters $\hat{\theta}_y^{SD}$. SI feature extractor $M_f^{SI}$ and discriminator network 710 are discarded after parameter training.

In the case of an AED model which generates sequences of WSUs, the WSUs in the adaptation data are typically sparsely distributed among a very large number (e.g., ~33 k) of possible WSU output units. A large proportion of WSU output units are therefore unseen during the adaptation, which would overfit the SD AED model to a small space of WSU sequences observed in the adaptation data. To address this target sparsity issue, some embodiments augment a primary task of predicting a large number of WSU output units with an auxiliary task of predicting a small number (e.g., ~30) of character output units to improve the primary task via Multi-Task Learning (MTL). The adaptation data is expected to cover a much higher percentage of the character output units than that of the possible WSU output units. Predicting the fully-covered character labels as a secondary task exposes the SD AED to an enlarged acoustic space and may therefore effectively regularize the primary task of WSU prediction.

Figure 8:
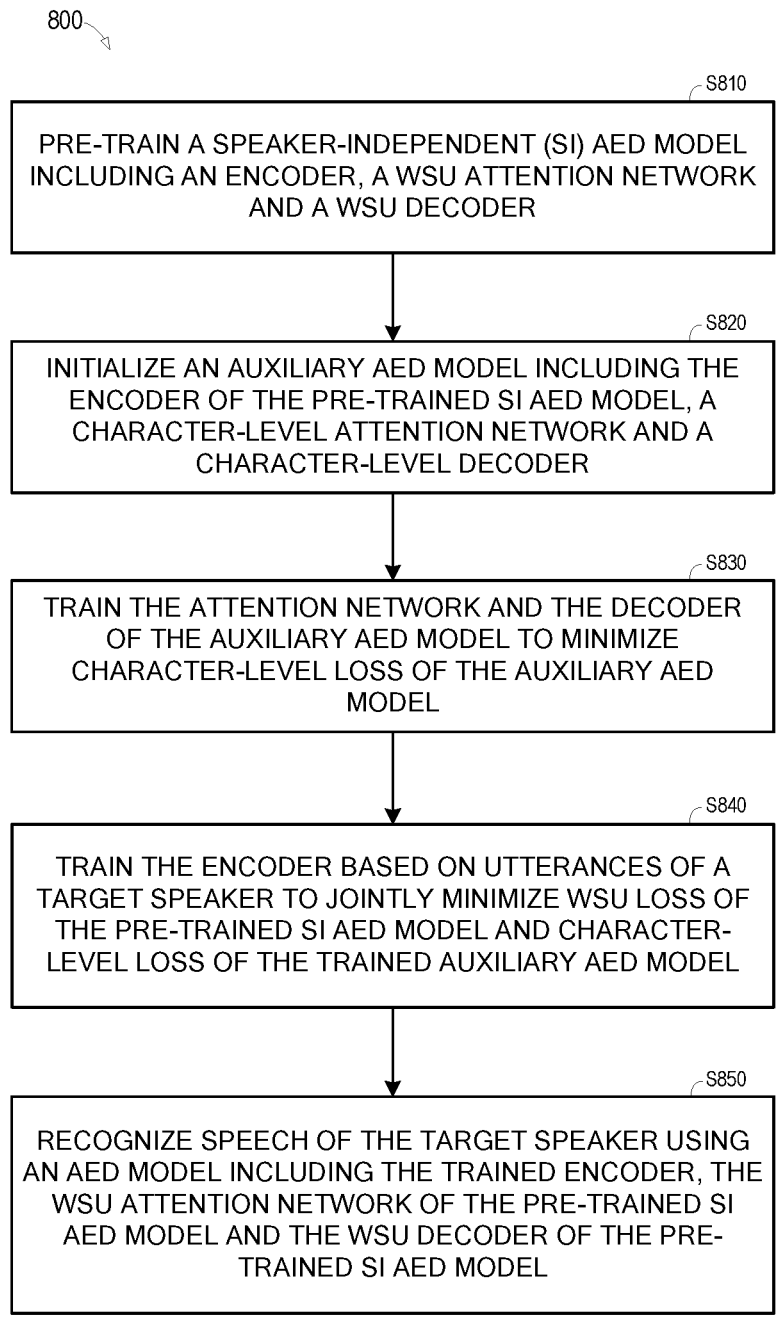
FIG. 8 is a flow diagram of a process to adapt a speaker-independent AED model to a target speaker based on multi-task learning according to some embodiments.

FIG. 8 is a flow diagram of process 800 to adapt a speaker-independent AED model to a target speaker based on MTL according to some embodiments. A speaker-independent AED model including an encoder, a WSU attention network and a WSU decoder is trained at S810 to minimize a WSU loss as is known in the art. For example, S810 may comprise training of AED model 100 of FIG. 1 based on a large training set of labeled utterances of a large number of speakers.

Figure 9:
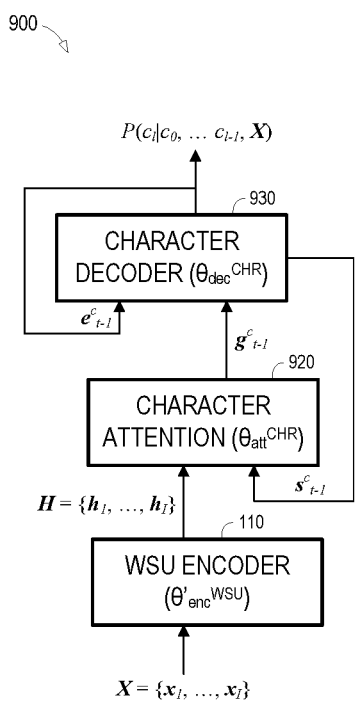
FIG. 9 is a block diagram illustrating a training architecture of an auxiliary AED model including an encoder of a pre-trained speaker-independent AED model, a character-level attention network and a character-level decoder according to some embodiments.

An auxiliary AED model is initialized at S820 using the encoder of the AED model trained at S810, a character-level attention network and a character-level decoder. FIG. 9 illustrates auxiliary AED model 900 initialized at S820 according to some embodiments. Auxiliary AED model 900 outputs posteriors of character output units $P(c_l|c_0, \ldots c_{l-1}, X)$ and includes WSU encoder 110 having trained encoder parameters $\theta_{enc}^{WSU}$.

At S830, the attention network and the decoder of the auxiliary AED model are trained to minimize character-level loss of the auxiliary AED model. For example, parameters $\theta_{att}^{CHR}$ of attention network 920 and parameters $\theta_{dec}^{CHR}$ of decoder 930 may be trained to minimize the character-level AED loss while keeping encoder parameters $\theta_{enc}^{WSU}$ fixed as follows:

$$\mathcal{L}_{AED}^{CHR}(\theta^{CHR}, \mathbb{T}_r) = - \sum_{(X,C) \in \mathbb{T}_r} \sum_{t=1}^{|C|} P(c_l | C_{0:t-1}, X, \theta^{CHR})$$

$$(\hat{\theta}_{dec}^{CHR}, \hat{\theta}_{att}^{CHR}) = \arg\min_{\theta_{dec}^{CHR}, \theta_{att}^{CHR}} \mathcal{L}_{AED}^{CHR}(\theta_{enc}^{WSU}, \theta_{dec}^{CHR}, \theta_{att}^{CHR}, \mathbb{T}_r)$$

where $C=\{c_0, \ldots c_L\}$ is the sequence of character labels corresponding to X and Y. S830 may utilize a same training set $\mathbb{T}_r$ as used to train the speaker-independent AED model at S810, albeit with character-level labels. $\hat{\theta}_{dec}^{CHR}$ and $\hat{\theta}_{att}^{CHR}$ denote the parameters trained at S830.

Figure 10:
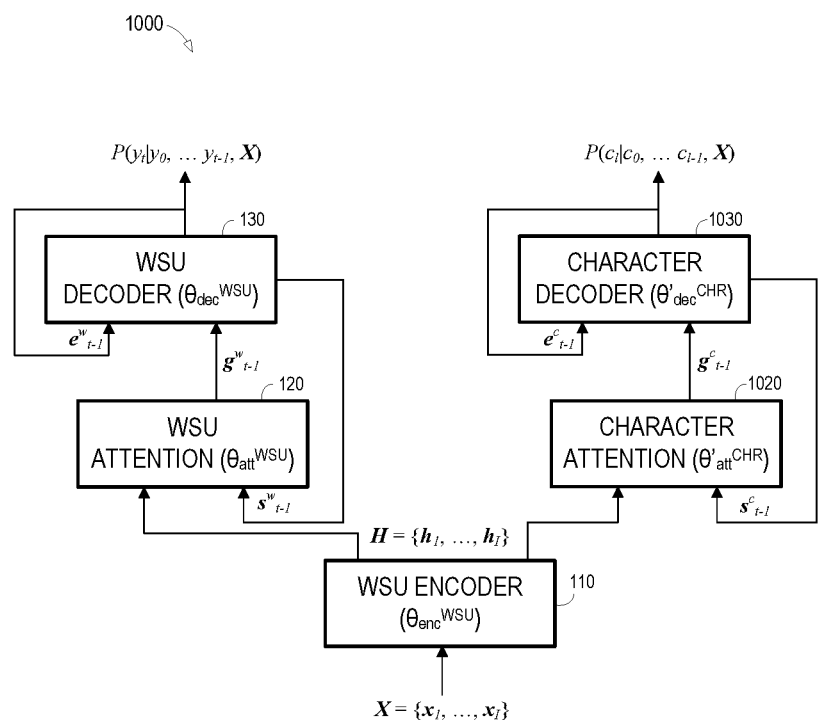
FIG. 10 is a block diagram illustrating training of an encoder of a pre-trained speaker-independent AED model to jointly minimize word/subword unit loss of the pre-trained AED model and character-level loss of the trained auxiliary AED model according to some embodiments.

Next, at S840, the encoder of the pre-trained SI AED model is trained based on utterances of a target speaker to jointly minimize WSU loss of the pre-trained SI AED model and character-level loss of the trained auxiliary AED model. FIG. 10 illustrates MTL network 1000 for use in training WSU encoder 110 at S840 according to some embodiments. As shown, both WSU attention network 120 and character attention network 1020 receive encoded features H from WSU encoder 110.

The initial (i.e., pre-trained) parameters of WSU encoder 110, WSU attention network 120 and WSU decoder 130 are $\theta_{enc}^{WSU}$, $\theta_{att}^{WSU}$, $\theta_{dec}^{WSU}$, respectively. The initial parameters of character attention network 1020 are $\hat{\theta}_{att}^{CHR}$ and the initial parameters of character decoder 1030 are $\hat{\theta}_{dec}^{CHR}$ as trained at S830. During training at S840, only parameters $\theta_{enc}^{WSU}$ are updated. For example:

$$(\hat{\theta}_{enc}^{WSU}) = \arg\min_{\theta_{enc}^{WSU}} \left[ \beta \mathcal{L}_{AED}^{WSU}(\theta_{enc}^{WSU}, \theta_{dec}^{WSU}, \theta_{att}^{WSU}, \mathbb{A}) + \right.$$

$$\left. (1-\beta) \mathcal{L}_{AED}^{CHR}(\theta_{enc}^{WSU}, \hat{\theta}_{dec}^{CHR}, \hat{\theta}_{att}^{CHR}, \mathbb{A}) \right]$$

Figure 11:
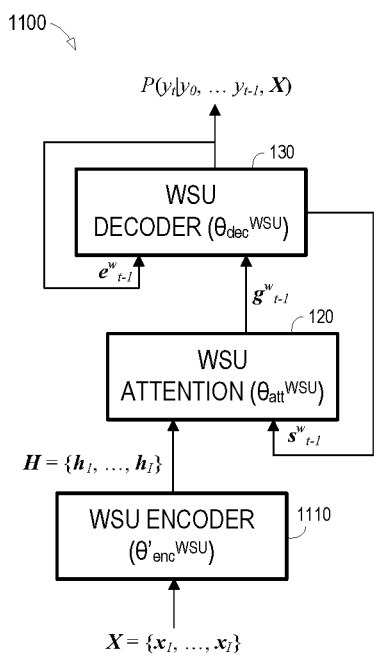
FIG. 11 is a block diagram of a speaker-adapted AED model according to some embodiments.

After training of the encoder at S840, speech of the target speaker may be recognized using an AED model including the trained encoder. More specifically, and as depicted in FIG. 11, resulting speaker-adapted AED model 1100 includes trained WSU encoder 1110 having parameters $\hat{\theta}_{enc}^{WSU}$, WSU attention network 120 of the pre-trained SI AED model having parameters $\theta_{att}^{WSU}$ and WSU decoder 130 of the pre-trained SI AED model having parameters $\theta_{dec}^{WSU}$. The character-level decoder and attention network of the auxiliary AED model are discarded.

Any speaker-adapted AED model described herein may be used as a component of an automatic speech recognition unit in any number of different types of devices and systems. For example, automatic speech recognition using a speaker-adapted AED model can be implemented in digital assistants, chatbots, voice control applications, and other related devices and systems including in associated voice services such as software development kit (SDK) offerings. Automatic speech recognition services using a speaker-adapted AED model can be implemented in cloud architectures.

Figure 12:
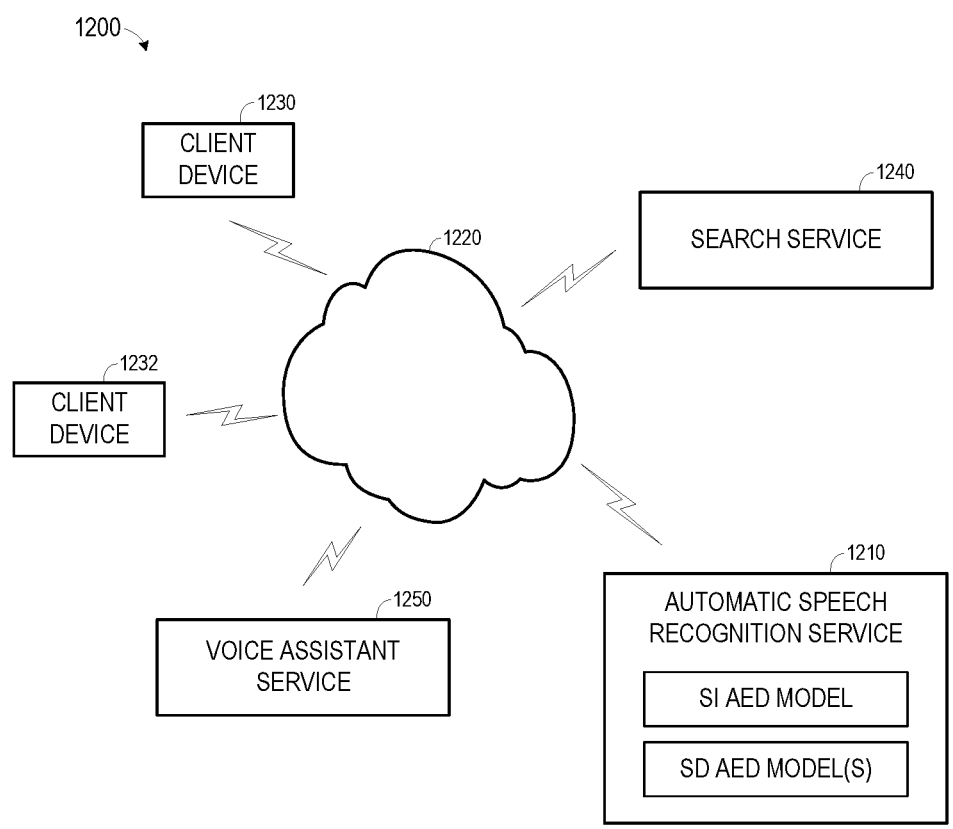
FIG. 12 is a block diagram of a cloud computing architecture providing speech recognition services according to some embodiments.

FIG. 12 illustrates architecture 1200 providing speech recognition services according to some embodiments. System 1200 may be cloud-based and components thereof may be implemented using on-demand virtual machines, virtual servers and cloud storage instances. Such cloud-based components may be connected to the Internet and/or to any network or combinations of networks. A cloud can include a wide area network (WAN) like the public Internet or a private, national or global network, and may include a local area network (LAN) within an organization providing the services of the data center.

As shown, automatic speech recognition service 1210 may be implemented as a cloud service providing transcription of speech audio signals received over cloud 1220. Automatic speech recognition service 1210 may include a SI AED model trained using any suitable training system and one or more SD AED models trained as described above. Each of the one or more SD AED models may be usable to recognize the speech of a respective target speaker as described above.

Each of client devices 1230 and 1232 may be operated to request services such as search service 1240 and voice assistant service 1250. Services 1240 and 1250 may, in turn, request automatic speech recognition functionality from automatic speech recognition service 1210. Such a request may include an identifier of a target speaker and/or adaptation data (e.g., utterances) associated with the target speaker. Using such an identifier and/or data, service 1210 may identify a SD AED model associated with the target speaker or adapt the SI AED model to generate a SD AED model associated with the target speaker. Service 1210 may then use the identified and/or generated SD AED model to perform automatic speech recognition on speech of the target speaker.

Figure 13:
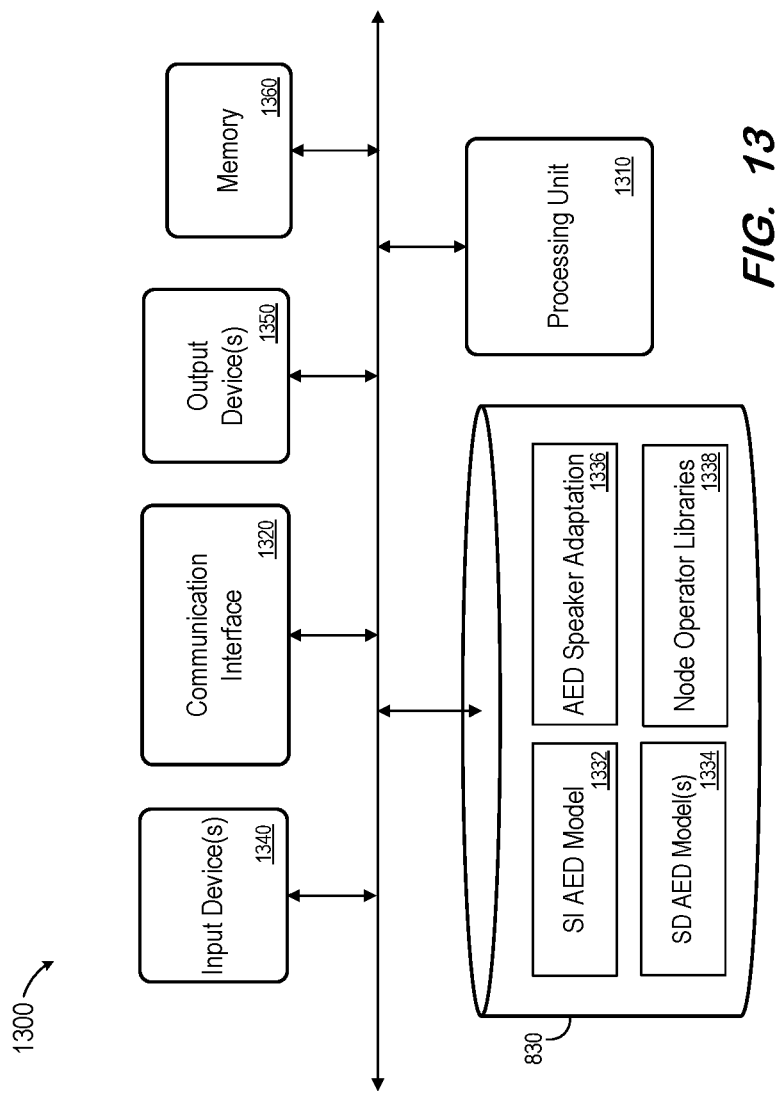
FIG. 13 is a block diagram of a system to provide speaker-adapted automatic speech recognition according to some embodiments.

FIG. 13 is a block diagram of system 1300 according to some embodiments. System 1300 may comprise a general-purpose server computer and may execute program code to provide an automatic speech recognition service as described herein. System 1300 may be implemented by a cloud-based virtual server according to some embodiments.

System 1300 includes processing unit 1310 operatively coupled to communication device 1320, persistent data storage system 1330, one or more input devices 1340, one or more output devices 1350 and volatile memory 1360. Processing unit 1310 may comprise one or more processors, processing cores, etc. for executing program code. Communication interface 1320 may facilitate communication with external devices, such as client devices, and data providers as described herein. Input device(s) 1340 may comprise, for example, a keyboard, a keypad, a mouse or other pointing device, a microphone, a touch screen, and/or an eye-tracking device. Output device(s) 1350 may comprise, for example, a display (e.g., a display screen), a speaker, and/or a printer.

Data storage system 1330 may comprise any number of appropriate persistent storage devices, including combinations of magnetic storage devices (e.g., magnetic tape, hard disk drives and flash memory), optical storage devices, Read Only Memory (ROM) devices, etc. Memory 1360 may comprise Random Access Memory (RAM), Storage Class Memory (SCM) or any other fast-access memory.

SI AED model 1332 may comprise program code executed by processing unit 1310 to cause system 1300 to recognize output units based on input speech frame as described herein. SD AED models 1334 may be associated with respective target speakers and may be adapted from SI AED model 1332 based on adaptation data of the target speakers as described herein. Accordingly, SD AED models 1334 may comprise program code executed by processing unit 1310 to cause system 1300 to recognize output units based on input speech signals of the target speakers.

AED speaker adaptation 1336 may comprise program code executed by processing unit 1310 to cause system 1300 to adapt an SI AED model based on adaptation data of a target speaker as described herein. Node operator libraries 1338 may comprise program code to execute functions of neural network nodes based on associated parameter values, and may therefore be used to execute one of models 1332 and 1334. Data storage device 1330 may also store data and other program code for providing additional functionality and/or which are necessary for operation of system 1300, such as device drivers, operating system files, etc.

Each functional component and process described herein may be implemented at least in part in computer hardware, in program code and/or in one or more computing systems executing such program code as is known in the art. Such a computing system may include one or more processing units which execute processor-executable program code stored in a memory system.

Processor-executable program code embodying the described processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Embodiments are not limited to the examples described below.

The foregoing diagrams represent logical architectures for describing systems according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

The diagrams described herein do not imply a fixed order to the illustrated methods, and embodiments may be practiced in any order that is practicable. Moreover, any of the methods described herein may be performed by hardware, software, or any combination of these approaches. For example, a computer-readable storage medium may store thereon instructions which when executed by a machine result in performance of methods according to any of the embodiments described herein.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
a processing unit; and
a memory storage device including program code that when executed by the processing unit causes to the system to:
train a speaker-independent attention-based encoder-decoder model to classify output units based on first input speech frames, the trained speaker-independent attention-based encoder-decoder model associated with a first output distribution;
adapt the speaker-independent attention-based encoder-decoder model by training the speaker-independent attention-based encoder-decoder model to classify output tokens based on input speech frames of a target speaker, and simultaneously training the speaker-independent attention-based encoder-decoder model to maintain a similarity between the first output distribution and a second output distribution of the adapted speaker-independent attention-based encoder-decoder model; and
perform automatic speech recognition using the adapted speaker-independent attention-based encoder-decoder model.

2. The system of claim 1, wherein adaptation of the speaker-independent attention-based encoder-decoder model comprises:
initializing of a speaker-dependent attention-based encoder-decoder model with an encoder, an attention network and a decoder of the trained speaker-independent attention-based encoder-decoder model;
training of the speaker-dependent attention-based encoder-decoder model to minimize an output token classification loss with respect to the input speech frames of the target speaker, and simultaneously training the speaker-dependent attention-based encoder-decoder model to minimize a divergence measure between the first output distribution and the second output.

3. The system of claim 2, wherein the divergence measure is a Kullback-Leibler divergence.

4. The system of claim 1, wherein adaptation of the speaker-independent attention-based encoder-decoder model comprises:
initializing of a speaker-dependent attention-based encoder-decoder model with an encoder, an attention network, lower decoder layers and upper decoder layers of the trained speaker-independent attention-based encoder-decoder model;
initializing of a discriminator to receive data from the lower decoder layers of the speaker-dependent attention-based encoder-decoder model and data from the lower decoder layers of the speaker-independent attention-based encoder-decoder model and to output a prediction of whether received data was generated by the speaker-dependent attention-based encoder-decoder model; and
simultaneous training, based on the input speech frames of the target speaker, of the speaker-dependent attention-based encoder-decoder model to minimize an output token classification loss, of the discriminator to minimize a discrimination loss, and of the encoder, the attention network, and the lower decoder layers of the speaker-dependent attention-based encoder-decoder model to maximize the discrimination loss.

5. The system of claim 1, wherein the output tokens are word/subword units, and wherein adaptation of the speaker-independent attention-based encoder-decoder model comprises:
initializing of an auxiliary attention-based encoder-decoder model with an encoder of the trained speaker-independent attention-based encoder-decoder model, a character-level attention network, and a character-level decoder;
training of the character-level attention network and the character-level decoder based on the input speech frames of the target speaker to minimize a character-level classification loss; and
training of the encoder of the trained speaker-independent attention-based encoder-decoder model based on the input speech frames of the target speaker to jointly minimize the word/subword unit classification loss of the trained speaker-independent attention-based encoder-decoder model and the character-level classification loss of the auxiliary attention-based encoder-decoder model.

6. The system of claim 5, wherein parameters of a word/subword unit attention network of the trained speaker-independent attention-based encoder-decoder model, parameters of a word/subword unit decoder network of the trained speaker-independent attention-based encoder-decoder model, parameters of the trained character-level attention network, and parameters of the trained character-level decoder are fixed during training of the encoder of the trained speaker-independent attention-based encoder-decoder model based on the input speech frames of the target speaker to jointly minimize the word/subword unit classification loss of the trained speaker-independent attention-based encoder-decoder model and the character-level classification loss of the auxiliary attention-based encoder-decoder model.

7. The system of claim 6, wherein automatic speech recognition is performed using the trained encoder, the word/subword unit attention network of the trained speaker-independent attention-based encoder-decoder model, and the word/subword unit decoder of the trained speaker-independent attention-based encoder-decoder model.

8. A computer-implemented method comprising:
training a first attention-based encoder-decoder model for automatic speech recognition, the trained speaker-independent attention-based encoder-decoder model associated with a first output distribution;
adapting the first attention-based encoder-decoder model for automatic speech recognition of speech of a target speaker, and to maintain a similarity between the first output distribution and a second output distribution of the adapted attention-based encoder-decoder model; and
performing automatic speech recognition using the adapted speaker-independent attention-based encoder-decoder model.

9. The method of claim 8, wherein adapting the speaker-independent attention-based encoder-decoder model comprises:

initializing a speaker-dependent attention-based encoder-decoder model with an encoder, an attention network and a decoder of the trained first attention-based encoder-decoder model;

training the speaker-dependent attention-based encoder-decoder model to minimize an output token classification loss with respect to input speech frames of the target speaker, and simultaneously training the speaker-dependent attention-based encoder-decoder model to minimize a divergence measure between the first output distribution and the second output distribution.

10. The method of claim 9, wherein the divergence measure is a Kullback-Leibler divergence.

11. The method of claim 8, wherein adapting the first speaker-independent attention-based encoder-decoder model comprises:

initializing a speaker-dependent attention-based encoder-decoder model with an encoder, an attention network, lower decoder layers and upper decoder layers of the trained first attention-based encoder-decoder model;

initializing a discriminator to receive data from the lower decoder layers of the speaker-dependent attention-based encoder-decoder model and data from the lower decoder layers of the first attention-based encoder-decoder model and to output a prediction of whether received data was generated by the speaker-dependent attention-based encoder-decoder model; and simultaneous training, based on the input speech frames of the target speaker, of the speaker-dependent attention-based encoder-decoder model to minimize an output token classification loss, of the discriminator to minimize a discrimination loss, and of the encoder, the attention network, and the lower decoder layers of the speaker-dependent attention-based encoder-decoder model to maximize the discrimination loss.

12. The method of claim 8, wherein adaptation of the first attention-based encoder-decoder model comprises:

initializing of an auxiliary attention-based encoder-decoder model with an encoder of the trained first attention-based encoder-decoder model, a character-level attention network, and a character-level decoder;

training of the character-level attention network and the character-level decoder based on input speech frames of the target speaker to minimize a character-level classification loss; and training of the encoder of the trained first attention-based encoder-decoder model based on the input speech frames of the target speaker to jointly minimize a word/subword unit classification loss of the trained first attention-based encoder-decoder model and the character-level classification loss of the auxiliary attention-based encoder-decoder model.

13. The method of claim 12, wherein parameters of a word/subword unit attention network of the trained speaker-independent attention-based encoder-decoder model, parameters of a word/subword unit decoder network of the trained speaker-independent attention-based encoder-decoder model, parameters of the trained character-level attention network, and parameters of the trained character-level decoder are fixed during training of the encoder of the trained speaker-independent attention-based encoder-decoder model based on the input speech frames of the target speaker to jointly minimize the word/subword unit classification loss of the trained speaker-independent attention-based encoder-decoder model and the character-level classification loss of the auxiliary attention-based encoder-decoder model.

14. The method of claim 13, wherein automatic speech recognition is performed using the trained encoder, the word/subword unit attention network of the trained speaker-independent attention-based encoder-decoder model, and the word/subword unit decoder of the trained speaker-independent attention-based encoder-decoder model.

15. A non-transient, computer-readable medium storing program code to be executed by a processing unit to provide:

a first attention-based encoder-decoder model to classify output tokens based on input speech frames, the first attention-based encoder-decoder model associated with a first output distribution; and a second attention-based encoder-decoder model to classify output tokens based on input speech frames, the second attention-based encoder-decoder model being associated with a second output distribution, wherein the second attention-based encoder-decoder model is trained to classify output tokens based on input speech frames of a target speaker, and simultaneously trained to maintain a similarity between the first output distribution and a second output distribution of the second attention-based encoder-decoder model.

16. The medium of claim 15, wherein the second attention-based encoder-decoder model is initialized with an encoder, an attention network and a decoder of the first attention-based encoder-decoder model, and wherein training of the second attention-based encoder-decoder mode comprises training of the second attention-based encoder-decoder model to minimize an output token classification loss with respect to the input speech frames of the target speaker, and simultaneously training the second attention-based encoder-decoder model to minimize a divergence measure between the first output distribution and the second output distribution.

17. The medium of claim 16, wherein the divergence measure is a Kullback-Leibler divergence.

18. The medium of claim 15, wherein the second attention-based encoder-decoder model is initialized with an encoder, an attention network, lower decoder layers and upper decoder layers of the first attention-based encoder-decoder model;

wherein training of the second attention-based encoder-decoder model comprises:

initializing a discriminator to receive data from the lower decoder layers of the second attention-based encoder-decoder model and data from the lower decoder layers of the first attention-based encoder-decoder model and to output a prediction of whether received data was generated by the second attention-based encoder-decoder model; and simultaneous training, based on the input speech frames of the target speaker, of the second attention-based encoder-decoder model to minimize an output token classification loss, of the discriminator to minimize a discrimination loss, and of the encoder, the attention network, and the lower decoder layers of the second attention-based encoder-decoder model to maximize the discrimination loss.

19. The medium of claim 15, wherein the output tokens are word/subword units, the second attention-based encoder-decoder model is initialized with an encoder, an attention network, and a decoder of the first attention-based encoder-decoder model, and wherein training of the second attention-based encoder-decoder model comprises:

initializing an auxiliary attention-based encoder-decoder model with an encoder of the first attention-based encoder-decoder model, a character-level attention network, and a character-level decoder;

training the character-level attention network and the character-level decoder based on the input speech frames of the target speaker to minimize a character-level classification loss; and training of the encoder of the second attention-based encoder-decoder model based on the input speech frames of the target speaker to jointly minimize a word/subword unit classification loss of the second attention-based encoder-decoder model and the character-level classification loss of the auxiliary attention-based encoder-decoder model.

20. The medium of claim 19, wherein parameters of a word/subword unit attention network of the second attention-based encoder-decoder model, parameters of a word/subword unit decoder network of the second attention-based encoder-decoder model, parameters of the trained character-level attention network, and parameters of the trained character-level decoder are fixed during training of the encoder of the second attention-based encoder-decoder model based on the input speech frames of the target speaker to jointly minimize the word/subword unit classification loss of the second attention-based encoder-decoder model and the character-level classification loss of the auxiliary attention-based encoder-decoder model.

* * * * *